United States Patent Office 3,042,418
Patented July 3, 1962

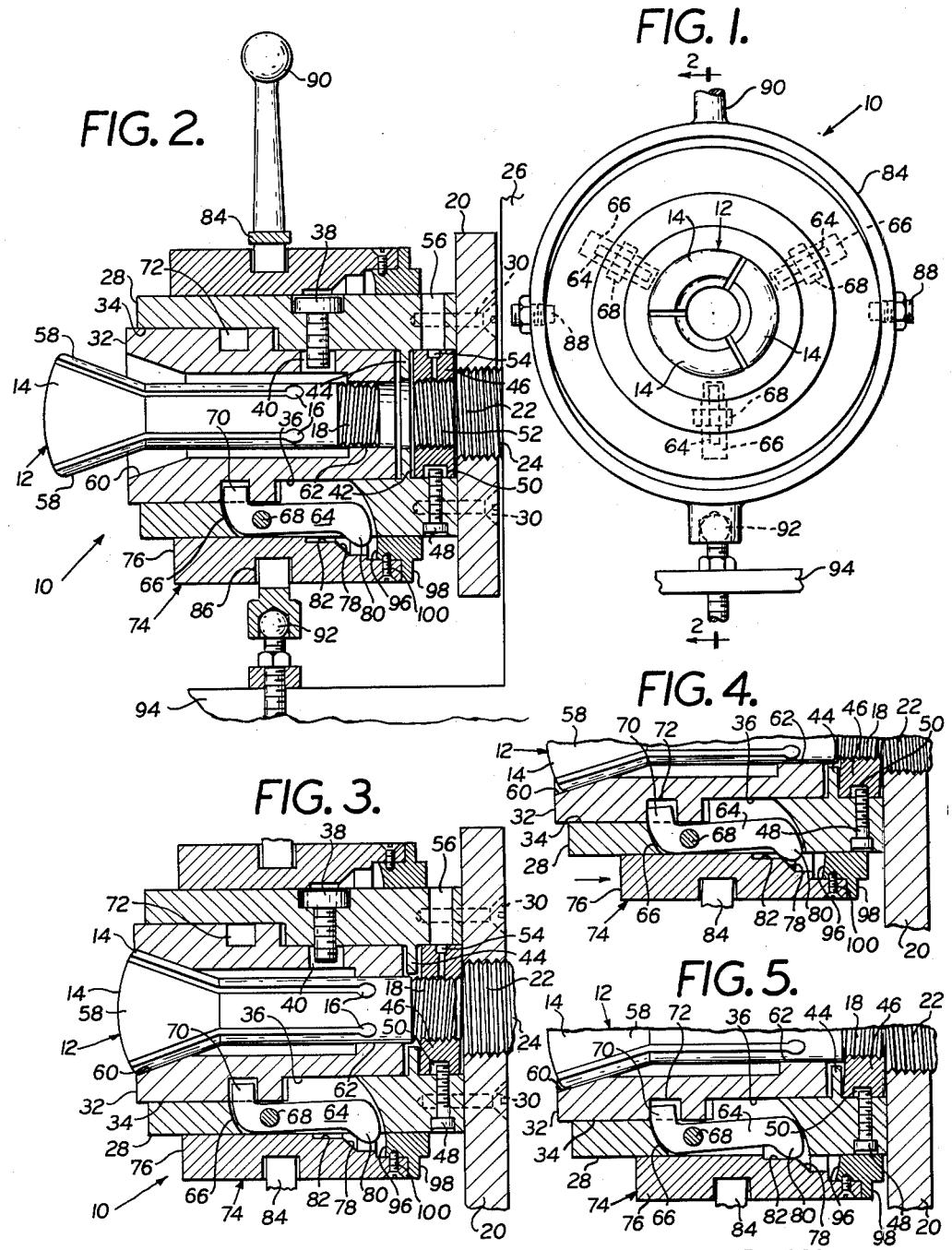

3,042,418
CHUCK MECHANISM FOR COLLETS
George Sorsa, Huntington Station, and Robert E. Curran, Huntington, N.Y. (both % Royal Products Co., 88 Union St., Mineola, N.Y.); said Sorsa assignor to said Curran
Filed Jan. 25, 1960, Ser. No. 4,316
12 Claims. (Cl. 279—50)

This invention relates to chucks and more particularly to chucks of the type to be connected for rotation with a spindle of a lathe or similar machine and intended to be utilized with collets that have a plurality of contractible work-engaging jaws.

Chucks for collets of the type disclosed in the United States patent to Zagar, Serial No. 2,466,651, are well known. However, each of such prior art collet type chucks suffer from the same problem. The collet secured for rotation with the chuck taught by Zagar must be securely screwed into the same. Because such collets employed with the chucks known in the prior art are mass produced in a relatively inexpensive manner, the threads formed on the rear thereof are generally not made to precision measurements. Hence, it often happens that when the collet is threadedly secured into the chuck, its inaccurately formed threads tilt the collet slightly in the chuck to canter the same off center or out of axial alignment with the axis of rotation of the chuck thereby disaligning the axis of the collet with the axis of the chuck.

Accordingly, the workpiece that is subsequently engaged between the contractible jaws of the collet will also be disaligned with the axis of rotation of the chuck and subsequently the same will rotate in an eccentric or elliptically formed arc when the chuck is rotated by the spindle of the lathe or machine. To remedy this problem it is necessary for the machine operator to "true-up" the workpiece in the collet before he can perform the necessary operations thereon. The "truing-up" function requires the use of gages to assure that the workpiece rotates in axial alignment with that of the axis of the chuck thereby resulting in an unnecessary expenditure of time by the operator and a consequent increase in labor costs.

It is the desideratum of this invention to provide a chuck of the type aforementioned that will mount the collet concentrically and in alignment with the axis of rotation thereby thereby enabling the jaws of the collet to be contracted equally and simultaneously about the workpiece so as to position the workpiece in axial alignment with the axis of rotation of the spindle.

Another object of the invention is to provide a chuck in which means are positively actuated to cause the jaws of the collet to contract, and means to lock the same in their contracted position, and further means to enable their positive return from their contracted position.

Other objects and features of the invention reside in the unique arrangement of structural elements that enable the concentric mounting of the collet in the chuck and the simple operation of the parts thereof to quickly and positively actuate the collet jaws.

Other and further objects of my invention reside in the structures and arrangements hereinafter more fully described with reference to the accompanying drawing in which:

FIG. 1 is a front elevational view of the collet chuck constructed in accordance with the teaching of the invention, FIG. 2 is a section of FIG. 1 taken substantially along lines 2—2 showing the collet in its unmounted position, FIG. 3 is a view similar to FIG. 2 showing the collet concentrically mounted in its normal position in the chuck, FIG. 4 is a partial view of the chuck and collet of FIG. 2 showing the relative position of the elements for partially contracting the work engaging jaws of the collet, and FIG. 5 is a partial view of the chuck and collet wherein the collet jaws are shown locked in their contracted position.

Referring now to the drawing there is shown a chuck device generally identified by the numeral 10 for use with collets of the type generally identified by the numeral 12. The collet 12 is of well known construction and comprises a plurality of contractible jaws 14, three in number, that are spaced from each other at one end of the collet and merge to be formed integrally with the body of the collet at their rear portions 16. The rear end of the collet is threaded at 18 whereby the same may be mounted for rotation with the chuck device 10.

The chuck device 10 comprises a face plate 20 that is threaded at 22. The face plate 20 is adapted to be threadedly secured at 22 to a rotatable spindle 24 projecting from the head stock 26 of a lathe or other similar machine (see FIG. 1). Adapted to be secured to the face plate 20 for rotation therewith in response to the rotation of the spindle 24 is an adapter member 28. The adapter member 28 may be secured to the face plate 20 in any suitable manner, as by the use of screws 30 that project through the rear of the face plate into threaded engagement with the rear of the adapter member 28. The adapter member 28 is circular in form and is adapted to receive a collet actuator member 32 centrally therein.

The interior of the adapter member 28 is stepped at its forward portion resulting in a larger diameter interior axially extending opening 34 and a smaller diameter interior axially extending opening 36. The collet actuator member 32 is similarly stepped about its outer surface for coinciding bearing engagement with the surfaces of the openings 34 and 36 and for axial movement therealong. The collet actuator member 32 is keyed for rotation with the adapter member 28 by the provision of a screw 38 that extends into an oversize opening or keyway 40 defined in the smaller diameter of the actuator member 32. The cooperation of the keying screw 38 in the oversized keyway 40 enables the actuator member 32 to remain in bearing engagement and for movement axially along and relative to the surfaces 34 and 36 of the adapter member and similarly to have lost motion rotation with the adapter member.

Defined in the rear portion of the adapter member 28 is a housing 42 separated from the forward portion of the interior of the adapter member by a radially disposed wall 44. Positioned within the housing 42 at the rear of the adapter member is a ring-shaped bushing means 46. The bushing means 46 is slightly smaller in diameter than the diameter of housing 42 and it is slightly shorter in length than the axial length of the housing as defined by the forward wall 44 and the adjacent surface of the face plate 20 to which the adapter member 28 is secured.

Therefore, the bushing 46 may be said to be freely or loosely or floatingly mounted in the housing 42 of the adapter member. A threaded key or screw 48 projects through the adjacent rear portion of the adapter member 28 into an oversize keyway 50 in the bushing thereby permitting the bushing to move loosely, both axially and radially relative to the confining walls of the housing 42, but to insure that the bushing means will have lost motion rotation with the adapter member. The bushing 46 is provided with a threaded interior 52 for threaded engagement by the rear end 18 of the collet 12. A set screw 54 is adapted to be threaded radially inward into engagement with the thread 18 of the collet when the same is positioned within the bushing 46 to prevent their accidental separation. Access to the set screw 54 is enabled by an oversize hole 56 drilled in the rear of the adapter.

The collet 12 is adapted to be inserted into the forward end of the axial opening of the actuator member 32 and rearward so that its threaded portion 18 extends through wall 44 for threaded engagement with the mating thread 52 of the bushing 46. After the collet is fully threaded into the bushing 46 it is locked therewith by the radial inward threading of the set screw 54. As the collet is threaded into engagement with the bushing 46, the tapered or inclined outer surface 58 of each jaw 14 is brought into mating and coinciding engagement with a similarly or correspondingly tapered or inclined annular actuator surface 60 defined at the forward interior portion of the actuator member 32. A narrowed diameter 62 provided on the actuator member 32 has surface bearing engagement with the body of the collet 12 to support the collet intermediate its ends. The body of the collet may be defined as that portion disposed intermediate the rear thread 18 and the rear merging portions 16 of the contractible jaws 14. This bearing engaging relationship is shown more clearly in FIGS. 3, 4 and 5.

Thus, as the collet is threaded rearward into the bushing 46 the inclined surfaces 58 ride inward into engaging relationship with the actuator surface 60 of the member 32. The relative movement of the surfaces 58 engaging along the surface 60 causes a force to be exerted on the collet that tends to move the same to the left or outwardly from the chuck. However, as the threading of the collet portion 18 into the bushing 46 continues, there are opposite forces set up between the engaged threads of the bushing and collet at one end opposing the outward force exerted by the engaging and relatively moving surfaces 58 and 60 at the other end. These oppositely directed forces, therefore, result in a tendency to pull the collet to the left or in a direction that will tend to remove the same from the actuator member 32. However, because the rear 18 of the collet is being threaded into the bushing 46, the collet is incapable of being dislodged from the actuator member and, therefore, the loosely mounted bushing 46 is pulled forward with the collet whereby its forward surface is pulled into tight frictional engagement with the adjacent rear surface of the separator wall 44 of the housing 42 within which the same is mounted.

As noted previously the difficulty encountered with collet type chucks is that when the collet is normally secured in the chuck, its non-precision formed threaded surface 18 very frequently canters the collet slightly within the chuck so that the jaws 14 thereof are positioned out of alignment with the axis of the chuck. In the present invention the loosely mounted bushing 46 performs in the nature of an adjustment mechanism that will compensate for the irregularities of the collet thread 18. Hence, when the collet 12 is threaded into the bushing 46, the forward wall of the bushing is positively pulled into frictional engagement with the adjacent rear surface of the separator wall 44 and it is so retained in engagement with the surface of such wall all during the time that the inclined surfaces 58 of the collet are in engagement with the actuator surface 60 of the member 32.

Thus, it is the force resulting from the surfaces 58 of the collet riding inward along the actuator surface 60 as the collet is threaded into the bushing 46 that physically pulls the bushing into engagement with the adjacent surface of the wall 44. It will be recognized by those skilled in the art that the loosely mounted bushing 46 is permitted to canter within the housing 42 and thus compensate for any eccentricities or off-axis imperfections in the collet thread 18. Hence, when the bushing is pulled tightly against the surface of the wall 44 only a portion of its wall actually engages the surface of the wall. This is shown in exaggerated form in FIG. 3 wherein, the bushing 46 is shown slightly spaced from the upper part of the wall 44 while the lower adjacent surface of the bushing is shown to be in tight frictional engagement with the lower portion of the wall.

Therefore, the ability of the bushing 46 to assume an angulated position relative to the adjacent surface of the wall 44 will compensate for the off-axis defects in the thread of the collet and thereby correctly position the collet on-axis with the thread 22 of the face plate 20 and consequently with the spindle 24. The cooperation of the narrowed diameter 62 of the actuator member 32 with the body of the collet serves to more positively and to initially position the collet on-axis with the spindle 24 and to retain the same in such position while it is being threaded into the bushing 46.

The bearing engagement between the actuator member 32 and the adapter member 28 along the stepped diameters 34 and 36 serves to correctly position and the actuator member concentrically within the adapter and, therefore, on-axis with the spindle 24. When the bushing 46 is so pulled into frictional engagement with the surface of the wall 44 by the forces exerted by the cooperation of the inclined surfaces 58 and 60, the collet may then be said to be in its normal position within the chuck 10 as shown in FIG. 3. When in normal position the collet jaws 14 are only slightly contracted from their normal or fully expanded condition and are under slight tension.

In order to actuate the collet jaws 14 to cause the same to contract about a workpiece (not shown) that may be inserted thereinto, a structure is provided to axially move the collet actuator member 32. This structure includes a plurality of operable finger means 64, three being shown in the drawing, equally spaced in suitable radial slots 66 defined in the adapter member 28. Each of the operable fingers 64 is pivotly mounted at 68 for movement within its respective slot 66. Each finger 64 has a forward actuator end 70 that fits within an annular opening 72 defined in the collet actuator member 32. The other end of each finger 64 projects radially beyond the confines of its slots 66 for engagement by a slidable mechanism generally identified by the numeral 74.

The slidable mechanism 74 comprises an actuator collar 76 that is slidably movable along the exterior of the adapter member 28. Collar member 76 includes an inclined surface means 78 that is adapted to engage the rear end 80 of each finger 64 when the actuator collar 76 is moved rearwardly toward the face plate 20. As the inclined surface 78 moves relative to the fingers 64, their rear ends 80 ride down therealong and they pivot radially inward simultaneously thereby bringing their respective forward actuating ends 70 into abutting engagement with the forward radially disposed surface of the annular opening 72, as shown more clearly in FIG. 4.

This pivoting movement of the fingers 64 causes the actuator member 32 to move axially forward within the adapter 28. Accordingly, the rear of the actuator member increases its spacing progressively away from the separator wall 44 of the adapter member corresponding to the degree of pivotal movement of the fingers 64. At the same time the inclined actuator surface 60 of the member 32 moves axially forward relative to and along the surfaces 58 of the jaws 14 of the collet while the collet is axially fixed to the adapter member 28 by the bushing 46. In consequence, the jaws 14 are caused to contract radially inward about any workpiece positioned therebetween. Continued movement of the collar 76 rearwardly toward the face plate 20 causes the rear ends 80 of the fingers 64 to ride off of the inclined surface 78 and onto a contiguous annular locking surface 82 as shown in FIG. 5. When the collar 76 is in the position as shown in FIG. 5, the contracted jaws 14 of the collet 12 are locked closed about the workpiece.

Any convenient means may be employed to actuate or slide the collar 76. In the present invention a yoke 84 is positioned about an annular slot 86 defined in the actuator collar 76. The yoke has a pair of diametrically disposed pivots 88 that fit within the slot 86 to move the collar in response to pivoting movement of an actuator lever 90. The actuator 90 is circumposed about the annular slot 86 and is pivotly mounted at its lower end on a ball 92 that is secured to the bed 94 of the lathe or other similar machine.

Thus, the actuator collar 76 may be slid axially along the outer surface of the adapter member 28 by simple pivoting movement of the actuator lever 90. Viewing FIG. 1, when the lever 90 is pivoted to the left or toward the forward end of the chuck 10 away from the face plate 20, the locking surface 82 moves axially away from the ends 80 of the fingers 64 and the fingers release their forwardly directed pressure on the forward wall of opening 74 in the collet actuator member 32. Accordingly, the spring tension of the surfaces 58 of the collet jaws 14 acting on the inclined actuator surface 60 actually cause the actuator member 32 to retract axially back into the adapter member 28 until the same assumes its normally engaged position with the inclined surfaces 58 of the jaws 14 as shown in FIG. 3. All during this return movement the cooperation of inclined surfaces 58 and 60 retain the bushing 46 in frictional engagement with the rear adjacent surface of the wall 44.

Quite obviously the actuator member 32 will move rearward an amount equal to that permitted by the corresponding forward movement of the collar 76 so that the actuator member 32 will continue its rearward movement to its normal position as shown in FIG. 3 until such time as the rear ends 80 of the fingers 64 move fully down the inclined surface 78. In order to insure positive release of the collet jaws 14 from about a workpiece that may have been previously secured therebetween, the slidable mechanism 74 includes a release surface 96 that is defined on a ring 98 made integral with the actuator collar 76 or secured thereto by any convenient means, as the screws 100.

After the collar 76 is moved back to its normal position as shown in FIG. 3, it may be necessary to positively jar or lift the fingers 64 so that they will physically aid in the return of the actuator member 32 from its actuating position as shown in FIG. 5 to its normal position as shown in FIG. 3. In order to accomplish this, a release surface 96 is provided. It will be seen in the figures of the drawing that surface 96 has a radially disposed arc that corresponds with the arc or curvature of the rear ends 80 of the fingers 64.

Thus, a positive lifting release of the fingers 64 may be accomplished by pivoting the actuator lever 90 fully to the left or in the forward direction of the chuck 10 so as to cause the release surface 96 to physically abut the correspondingly shaped rear ends 80 of the fingers 64 and to lift the same from their position as shown in FIG. 5 and return them to their normal position as shown in FIG. 3. This abrupt and positive pivotal movement of the fingers 64 will be imparted to the actuator member 32 to cause the same to be positively returned to its normal position as shown in FIG. 3. It will be understood that this return movement of the actuator member 32 is aided by the resilient engagement of the inclined surfaces 58 of the collet jaws with the inclined actuator surface 60.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

We claim:

1. A chuck comprising an adapter member to be attached to a rotating spindle, an opening defined in said member to receive a collet, means loosely connected with said adapter member to engage with said collet and connect the same with said adapter member for rotation therewith, said collet having contractible jaws, collet actuator means between said member and collet axially slidable relative to said collet to contract said collet jaws, operable means on said member to slide said actuator means to contract said jaws, and means slidable on said member to operate said operable means.

2. A chuck comprising a collet having contractible work engaging jaws, an adapter member to receive the collet therein, alignment means floatingly mounted in said member and having means thereon to fasten the collet thereto and for rotation with said member, actuator means slidably engaging said work engaging jaws to contract the same, and means slidable on said adapter member including operable means to slide said actuator means.

3. A chuck comprising a collet, a collet actuator having an axial opening in which said collet is received, said actuator bearingly engaging said collet for movement relative thereto to contract the jaws of the same, a rotatable adapter member in which said actuator is movable, means mounted in said adapter member for rotation therewith and limited floating movement relative thereof, means on said last named means for engagement with said collet to secure the same for rotation with said adapter member, and means to move said actuator including means slidable on said member and means operable by said slidable means to move said actuator relative to said collet.

4. In a chuck having a collet, a collet actuator having an axial opening defined therein and in which said collet is adapted to be received, an adapter in which said actuator is movable, means movable in said adapter to releasably secure said collet in axial alignment therein, means on said collet and actuator coacting to retain said movable means immovably against a wall of said adapter, means operable to move said collet actuator relative to said collet, and means slidable on said adapter and engageable with said operable means to operate the same.

5. In a chuck as in claim 4, said operable means comprising a plurality of fingers pivotally mounted in circumferentially spaced relationship on said adapter and engageable with said actuator to move the same.

6. A chuck comprising an adapter to be secured to a spindle for rotation therewith, said adapter having an axial opening and a bushing housing defined therein, an actuator axially slidable in said axial opening relative to said adapter and rotatable therewith, a collet in said actuator, a bushing loosely mounted in said adapter housing, means connecting said bushing for rotation with said adapter, operable means in said adapter to slide said actuator axially in said adapter, and means slidable on said adapter having a plurality of surfaces selectively engageable with said operable means to selectively operate the same and slide said actuator axially within said adapter.

7. In a chuck comprising an adapter to be attached to a spindle for rotation therewith, said adapter having a housing defined therein, a bushing smaller than said housing and loosely mounted therein for rotation with said adapter, an actuator slidable in said adapter, a jawed collet in said actuator engaged with said bushing and having surfaces thereon normally engaged by said actuator, said collet and actuator surfaces being inclined to retain said bushing in engagement with a wall of said housing, and means on said adapter to slidingly move said actuator.

8. A chuck comprising a rotatable member, a bushing loosely mounted in said member for rotation therewith, said bushing and member having engageable walls, a collet actuator slidable in and rotatable with said member, a jawed collet in said actuator for work engaging actuation thereby, said collet being secured to said bushing for rotation therewith and said collet and actuator having inclined surfaces normally coacting with each other to retain said walls of said bushing and member in engagement, and means on said member to slide said actuator to move its inclined surface relative to that of said collet to actuate the jaws thereof to engage work therebetween.

9. In a chuck for a collet, a collet actuator, a collet received in said actuator, a rotatable adapter about said actuator, a bushing loosely mounted in said adapter for rotation therewith and having a surface thereon immovably engageable with said adapter, said actuator having an inclined surface, said collet being threadedly engageable with said bushing and having an inclined surface engageable with said actuator inclined surface for movement relative thereto and to move said bushing surface into immovable engagement with said adapter.

10. In a chuck as in claim 9, said collet having a plurality of spaced jaws each defining a portion of said inclined surface, and means on said adapter to move said actuator inclined surface along and relative to said collet inclined surface to contract the jaws thereof.

11. In a chuck for a collet, an adapter to be connected to a spindle for rotation therewith, a collet having one end thereof threaded the other end of said collet defining a plurality of contractible jaws each having an inclined surface, an actuator slidable in said adapter and relative to said collet, said actuator having an inclined surface corresponding to that of said jaws for engaging movement relative thereto to contract said jaws, a bushing mounted for axial movement relative to said adapter and for rotation therewith, said bushing having a threaded surface defined therein for engagement with the threaded end of said collet to draw said inclined surfaces thereon into a normal position of engagement with said inclined surfaces of said actuator, and a wall on said bushing drawn into immovable engagement with said adapter during the relative threading of said collet in said bushing.

12. In a chuck as in claim 11, a plurality of fingers spaced about said adapter for engagement with said actuator to slide the same, an actuator collar slidable on said adapter and including first surface means thereon to engage and move said fingers to slide said actuator relative to said adapter to contract said jaws and second surface means defined thereon contiguous to said first surface means to lock said fingers in said actuator jaw contracting position, and third surface means on said collar to engage and move said fingers to slide said actuator whereby its surface is in its normal position of engagement with said collet surfaces.

References Cited in the file of this patent

UNITED STATES PATENTS

| | | |
|---|---|---|
| 1,856,406 | Wyrick | May 3, 1932 |
| 2,466,651 | Zager | Apr. 5, 1949 |

FOREIGN PATENTS

| | | |
|---|---|---|
| 725,432 | Great Britain | Mar. 2, 1955 |
| 956,008 | Germany | Jan. 10, 1957 |